US012759934B2

(12) United States Patent
El-Tawil et al.

(10) Patent No.: US 12,759,934 B2
(45) Date of Patent: Oct. 13, 2026

(54) STRIATED FIBER-BASED CONCRETE REINFORCEMENT

(71) Applicant: The Regents of the University of Michigan, Ann Arbor, MI (US)

(72) Inventors: Sherif El-Tawil, Ann Arbor, MI (US); Yuh-Shiou Tai, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 137 days.

(21) Appl. No.: 17/421,863

(22) PCT Filed: Jan. 10, 2020

(86) PCT No.: PCT/US2020/013058
§ 371 (c)(1),
(2) Date: Jul. 9, 2021

(87) PCT Pub. No.: WO2020/146717
PCT Pub. Date: Jul. 16, 2020

(65) Prior Publication Data

US 2022/0098099 A1 Mar. 31, 2022

Related U.S. Application Data

(60) Provisional application No. 62/790,776, filed on Jan. 10, 2019.

(51) Int. Cl.

| | |
|---|---|
| ***C04B 14/48*** | (2006.01) |
| ***C04B 28/02*** | (2006.01) |
| ***E04C 5/03*** | (2006.01) |

(52) U.S. Cl.
CPC .............. *C04B 14/48* (2013.01); *C04B 28/02* (2013.01); *E04C 5/03* (2013.01)

(58) Field of Classification Search
CPC ......... C04B 14/48; C04B 28/02; C04B 28/04; C04B 7/00; C04B 7/002; C04B 14/38; C04B 14/00; C04B 32/02; E04C 5/03; E04C 5/00; E04C 5/01; E04C 5/073
See application file for complete search history.

(56) References Cited

U.S. PATENT DOCUMENTS 4,610,926 A 9/1986 Tezuka
5,989,713 A 11/1999 Naaman
(Continued)

FOREIGN PATENT DOCUMENTS

DE 102008034250 A1 1/2010
JP S44-15538 B 7/1969
JP S46-43463 B 12/1971
(Continued)

OTHER PUBLICATIONS

WO-0046460-A1, machine translation (Year: 2000).*
(Continued)

*Primary Examiner* — Amber R Orlando
*Assistant Examiner* — Marites A Guino-O Uzzle
(74) *Attorney, Agent, or Firm* — Lempia Summerfield Katz LLC

(57) ABSTRACT

A composite structure includes a concrete matrix and a fiber embedded in the concrete matrix. The fiber includes steel. A surface of the fiber has a series of striations. The series of striations are arranged in a striation pattern.

15 Claims, 8 Drawing Sheets

(56) References Cited

U.S. PATENT DOCUMENTS

| | | | |
|---|---|---|---|
| 6,060,163 | A | 5/2000 | Naaman |
| 2015/0369568 | A1 | 12/2015 | Nielsen |

FOREIGN PATENT DOCUMENTS

| | | | | | |
|---|---|---|---|---|---|
| JP | S5794403 | A | | 6/1982 | |
| JP | S58181439 | A | | 10/1983 | |
| JP | 2000143308 | A | | 5/2000 | |
| JP | 2001220201 | A | | 8/2001 | |
| JP | 2002154852 | A | | 5/2002 | |
| JP | 2018002535 | A | | 1/2018 | |
| JP | 2018075727 | A | | 5/2018 | |
| KR | 100439865 | B1 | | 7/2004 | |
| KR | 20050026830 | A | | 3/2005 | |
| KR | 200386270 | Y1 | * | 6/2005 | |
| WO | WO-0046460 | A1 | * | 8/2000 | ............ E04B 5/012 |
| WO | 2016047910 | A1 | | 3/2016 | |

OTHER PUBLICATIONS

KR200386270Y1, machine translation (Year: 2005).*

The free dictionary by Farlex. Longitudinal axis [retrieved from the internet on Jul. 26, 2023 from <URL: https://encyclopedia2.thefreedictionary.com/longitudinal+axis>]. (Year: 2015).*

Wille, Kay & Naaman, Antoine. (2012). Pullout Behavior of High-Strength Steel Fibers Embedded in Ultra-High-Performance Concrete. ACI Materials Journal. 109. 479-488. (Year: 2012).*

Pająk, Małgorzata & Ponikiewski, Tomasz. (2017). Steel fibers with non-circular cross-section used as reinforcement in self-compacting concrete. Indian Journal of Engineering and Materials Sciences. 24. 251-260. (Year: 2017).*

Stengel, T. (2009). Effect of Surface Roughness on the Steel Fibre Bonding in Ultra High Performance Concrete (UHPC). In: Bittnar, Z., Bartos, P.J.M., Němeček, J., Šmilauer, V., Zeman, J. (eds) Nanotechnology in Construction 3. Springer, Berlin, Heidelberg. DOI:10.1007/978-3-642-00980-8_50 (Year: 2009).*

Alberti et al., "Pull-out behaviour and interface critical parameters of polyolefin fibres embedded in mortar and self-compacting concrete matrixes", Construction and Building Materials, 2016, pp. 607-622, vol. 112.

El-Tawil, et al., "Field Application of Nonproprietary Ultra-High-Performance Concrete", Jan. 2018, www.concreteinternational.com, 31 pages.

International Preliminary Report on Patentability in International Patent Application No. PCT/US2020/013058, dated Jul. 22, 2021, 9 pages.

International Search Report and Written Opinion of the International Searching Authority in International Patent Application No. PCT/US2020/013058, dated May 7, 2020, 12 pages.

T. Stengel, "Effect of Surface Roughness on the Steel Fibre Bonding in Ultra High Performance Concrete (UHPC)", Nanotechnology in Construction 3, Proceedings of the NICOM3, 2009, 10 pages.

Wille et al., "Pullout Behavior of High-Strength Steel Fibers Embedded in Ultra-High-Performance Concrete", ACI Materials Journal, Technical Paper, Title No. 109-M46, Jul.-Aug. 2012, 10 pages.

Extended European Search Report from European Patent Application No. 20738460, dated Aug. 29, 2022, 7 pages.

Japanese Office Action from Japanese Patent Application No. 2021-540271, dated Nov. 1, 2023, 19 pages (including English translation).

Examination Report from European Patent Application No. 20 738 460.3, dated Aug. 21, 2023, 3 pages.

Final Office Action from Japanese Patent Application No. 2021-540271, dated Apr. 30, 2024, 9 pages (including English translation).

Tatsuya Tsubaki et al., "Effect of Fiber Properties on Mechanical Properties of Steel Fiber Reinforced Concrete Against Uniaxial Tension and Shear", Proceedings of Concrete Engineering, vol. 10, No. 2, pp. 109-118, May 31, 1999.

Yuichi Uchida, "Ultra High Strength Fiber Reinforced Concrete (UFC/UHPFRC)", Concrete Engineering, Japan, vol. 54, No. 5, pp. 514-518, May 1, 2017.

Final Office Action in Japanese Patent Application No. 2021-540271, dated Nov. 26, 2024, 7 pages (including English translation).

Office Action in Canadian Patent Application No. 3,126,452, dated Jan. 8, 2025, 4 pages.

Second Office Action in European Patent Application No. 20738460.3, dated Apr. 3, 2025, 5 pages.

Examiner's Report of Reconsideration Before Appeal in Japanese Patent Application No. 2021-540271, dated May 30, 2025, 10 pages, including English translation.

Notice of Reasons for Rejection in Japanese Patent Application No. 2021-540271, dated Jun. 6, 2026, 11 pages (including English translation).

* cited by examiner

STRIATED FIBER-BASED CONCRETE REINFORCEMENT

CROSS-REFERENCE TO RELATED APPLICATION

This U.S. National Phase application is based on International Application No. PCT/US2020/013058, filed Jan. 10, 2020, which claims the benefit of U.S. provisional application entitled "Striated Fiber-Based Concrete Reinforcement," filed Jan. 10, 2019, and assigned Ser. No. 62/790,776, the entire disclosures of which are hereby expressly incorporated by reference. Priority benefit of these earlier filed applications is hereby claimed.

BACKGROUND OF THE DISCLOSURE

Field of the Disclosure

The disclosure relates generally to fiber-based concrete reinforcement.

Brief Description of Related Technology

Cement structures are brittle in nature. A cement matrix has a compressive strength much higher than its tensile strength. Cement structures thus tend to crack under tensile stresses.

Various fibers have been added to a cement matrix to improve the tensile and bending strength, energy absorption, and toughness of the resultant cement structure. For instance, glass and carbon fibers have been used in bundles or strands, each strand having a number of filaments. Polymeric fibers have various forms, including monofilament, fibrillated film network, bundles, twisted yarns, and braided strands. These fibers may have a treated surface (etching or plasma treatment) to improve the bond between the fiber and the cement matrix.

Steel fibers have also been used to reinforce concrete. Steel fibers have been provided in several shapes: round (cut from wire), flat (sheared from steel sheets), and irregularly shaped from melt. The bond between the fibers and the cement matrix has been enhanced by mechanical deformations, such as crimping, twisting, adding hooks, or paddles at their ends, or roughening their surface.

Ultrahigh performance concrete is a concrete material having a matrix of densely packed components, as well as reinforcement via steel fibers. Exceptional strength levels are achieved, such as seven times that of conventional concrete. Ultrahigh performance concrete also provides significantly higher energy dissipation capacities, much improved chloride penetration resistance, and high freeze-thaw resistance. Unfortunately, the benefits of ultrahigh performance concrete are often outweighed by high costs. A significant fraction (e.g., 70%) of the high costs are associated with the steel fibers. Making matters worse, costs are increased further still if deformation of the fibers is used to increase the fiber-matrix bonding force.

SUMMARY OF THE DISCLOSURE

In accordance with one aspect of the disclosure, a composite structure includes a concrete matrix, and a fiber embedded in the concrete matrix, the fiber comprising steel. A surface of the fiber has a series of striations, the series of striations being arranged in a striation pattern.

In accordance with another aspect of the disclosure, a fiber for reinforcing concrete including a steel rod having a surface, and a series of striations in the surface of the steel rod. The series of striations are arranged in a striation pattern.

In accordance with yet another aspect of the disclosure, a method of manufacturing a fiber to be embedded in concrete for reinforcement of the concrete includes providing the fiber to a press, the press comprising a pair of press pieces, the pair of press pieces being spaced apart from one another by a gap, the pair of press pieces comprising at least one rounded press piece, rotating the rounded press piece, feeding the fiber through the gap between the pair of press pieces, the gap being smaller than a diameter of the fiber, and cutting the fiber into fiber sections after feeding the fiber through the gap. At least one of the pair of press pieces includes a set of teeth configured to striate the fiber to form a series of striations in the fiber having a striation pattern in accordance with the set of teeth.

In connection with any one of the aforementioned aspects, the structures and/or methods described herein may alternatively or additionally include any combination of one or more of the following aspects or features. The concrete matrix includes a plurality of shear keys, each shear key of the plurality of shear keys including a respective portion of the concrete matrix disposed in a respective striation of the series of striations. The fiber has a longitudinal axis. The series of striations do not modify the longitudinal axis of the fiber. The longitudinal axis is a straight axis for an entire length of the fiber. At least a subset of the series of striations is elongated in a direction transverse to the longitudinal axis. At least a subset of the series of striations is elongated in a direction oriented on a diagonal relative to the longitudinal axis. The striation pattern repeats along the longitudinal axis. Each striation of the series of striations is elongated and terminated at two ends. The striations of the series of striations are oriented in parallel with one another. The series of striations includes multiple subsets of parallel striations. The fiber has a circular cross section. Each striation of the series of striations is disposed within a segment of the circular cross-section. The surface of the fiber has a further series of striations. Each striation of the further series of striations is disposed within a further segment of the circular cross section. The fiber has a rectilinear cross section. The steel rod has a circular cross section. Each striation of the series of striations is disposed within a segment of the circular cross section. The surface of the steel rod has abrasions outside of the series of striations such that the steel rod is not smooth outside of the series of striations. The gap is sized relative to the diameter of the fiber such that a straight longitudinal axis of the fiber is maintained despite feeding the fiber through the gap. The set of teeth are configured such that the series of striations include diagonal striations oriented on a diagonal relative to a longitudinal axis of the fiber. The set of teeth are configured such that the series of striations include transverse striations oriented transversely to a longitudinal axis of the fiber. The method further includes rotating the fiber after feeding the fiber through the gap, and feeding the fiber through the gap again after rotating the fiber such that a second series of striations are formed in the fiber. The method further includes rotating the fiber while feeding the fiber. The method further includes feeding the rotated fiber through a second gap between a second pair of rounded press pieces of the press, the gap being smaller than a diameter of the fiber.

BRIEF DESCRIPTION OF THE DRAWING FIGURES

For a more complete understanding of the disclosure, reference should be made to the following detailed description and accompanying drawing figures, in which like reference numerals identify like elements in the figures.

Figure 1:
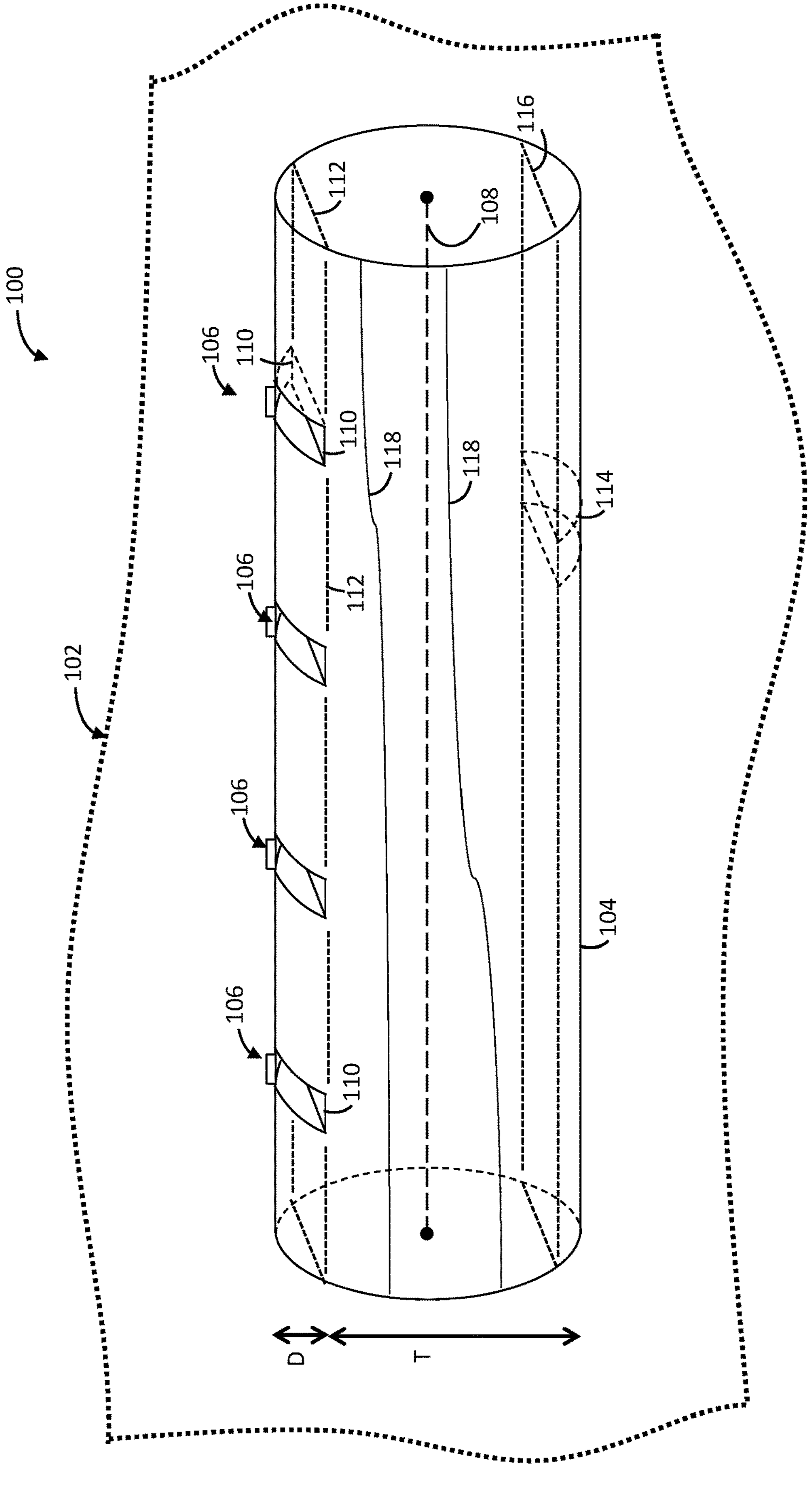
FIG. 1 is a schematic, perspective view of a cement reinforcement fiber having a series of striations arranged in a striation pattern in accordance with one example.

The embodiments of the disclosed structures, fibers, and methods may assume various forms. Specific embodiments are illustrated in the drawing and hereafter described with the understanding that the disclosure is intended to be illustrative. The disclosure is not intended to limit the invention to the specific embodiments described and illustrated herein.

DETAILED DESCRIPTION OF THE DISCLOSURE

Concrete reinforcement fibers with striation patterns, and composite structures having such striated fibers, are described. Systems and methods of manufacturing the striated fibers are also described. Striation of the surface of the fiber improves the bond between the fiber and the concrete matrix. The striations may exploit and/or interfere with a surface characteristic of the fibers that establishes a bond between the fiber and the concrete matrix. Higher tensile strength levels are thus achieved for a given amount/number of fibers. Alternatively or additionally, the improved bond may allow fewer fibers to be used to achieve a desired level of pullout strength and/or bond resistance, thereby reducing the overall cost of the concrete.

The disclosed fibers may be embedded in a matrix of ultrahigh performance concrete. The matrix of the ultrahigh performance concrete seeps into, or otherwise becomes disposed in, the striations. The concrete matrix resists fiber pullout through shear and friction. The concrete matrix may thus be considered to include a shear key disposed in each striation.

The use of striations allows the fibers to retain a straight longitudinal axis. Maintaining a straight axis preserves the fiber's axial stiffness. A straight axis also allows shorter length to be used (relative to fibers that use bent axis as mechanism to dissipate energy). Shorter lengths lead to lower costs. As used herein in connection with the axis of the fiber, the term "straight" should be understood to mean substantially or effectively straight. For instance, the fiber may have a small amount of curvature arising from the disclosed procedure (e.g., a rolling procedure) and/or a residual curvature remaining from being wound during shipment and/or storage. In either case, the small amount of curvature does not affect the axial stiffness of the fiber. The fiber is substantially or effectively straight as a result.

A variety of different striation patterns may be realized. The striation patterns are not limited to those described below. For instance, the striation patterns may be helical, linear, circular, oval, cross, and any other geometric shape or pattern. The various patterns may be realized by changing the knurls. The striation geometry may be used to tailor response, e.g. optimize for strength or energy dissipation (e.g., for blast applications). The depth of the indentation may be also be optimized or changed, e.g., by adjusting the distance between two press pieces used to striate the fiber.

The disclosed fibers may be manufactured in accordance with a manufacturing process that does not significantly increase costs. The disclosed methods may be conveniently and cost effectively implemented in connection with fiber cutting. The disclosed methods may use a pair of rotating press pieces to form the striations. The shape of striations may thus be determined by shape of teeth of knurls on one or both of the press pieces. The rotating press pieces are useful because the longitudinal axis of the fiber is maintained (e.g., straight). To that end, the gap between the press pieces (e.g., the teeth or knurls) may be sufficiently small (e.g., smaller than the fiber diameter, e.g., about 0.2 mm) so as to not bend the fiber into non-straight axis. The gap size may also be determinative of the depth of the indentations or striations (e.g., about 0.05 mm, but other depths may be used).

Although described in connection with a knurl-based method, the disclosed fibers may be manufactured by other methods. The processes may be directed to indenting and/or removing material. For instance, chemical etching processes or laser etching or ablation processes may be used. Still other techniques directed to surface indentation and/or material removal may be used.

Although described with ultrahigh performance concrete, the disclosed fibers may be used to reinforce a variety of different concrete mixtures. For instance, the disclosed fibers may be embedded in a conventional concrete matrix. A wide variety of other concrete mixtures may benefit from the disclosed fibers, including, for instance, polymer concrete. The matrix and other characteristics of the ultrahigh performance concrete may also vary. For instance, the ultrahigh performance may be configured as described in El-Tawil et al., "Field Application of Nonproprietary Ultra-High-Performance Concrete," www.concreteinternational.com (January 2018). The characteristics of the concrete matrix may thus vary considerably.

Although described in connection with straight, steel fibers of circular cross-section, the striation patterns may be applied to other shapes and types of fibers. For instance, the material composition of the fiber may vary. The fiber cross section may also vary, as other rounded (e.g., elliptical) and non-rounded (e.g., rectangular, triangular, and other rectilinear) fibers may be used. The surface of the fiber may also vary. The striation patterns may thus be applied to enhance the performance of various types of fibers, including smooth fibers, roughened or other fibers with surface abrasions, or deformed fibers, such as crimped, hooked, twisted fibers, or other fibers having a non-straight longitudinal axis.

Turning to the drawing figures, FIG. 1 depicts a composite structure 100 including a concrete matrix 102. The concrete matrix 102 may be or include any concrete mixture or material. The composition of the concrete matrix 102 may thus vary. In some cases, the concrete matrix 102 is or includes ultrahigh performance concrete, such as the mixture commercially available as Ductal from LaFarge Company of France. The ultrahigh performance concrete may be alternatively or additionally configured as described in U.S. Pat. No. 6,080,234 ("Composite Concrete"), the entire disclosure of which is hereby incorporated by reference. In other cases, the ultrahigh performance concrete may be configured as described in the above-referenced article.

The composition of the concrete matrix 102 may vary from the above-referenced ultrahigh performance concrete mixtures. Traditional and other concrete mixtures may be used instead, including, for instance, the above-referenced cement mixture.

The composite structure 100 includes one or more fibers 104 embedded in the concrete matrix 102. The fiber(s) 104 reinforce the concrete matrix 102 in a discontinuous fiber reinforcement scheme. The fibers 104 are thus embedded in the concrete matrix 102 as discrete fibers oriented in a plurality of orientations.

The fiber 104 depicted in FIG. 1 may be representative of the entire fiber or only a section or portion of a fiber embedded in the concrete matrix 102. In one example, the fiber length falls in a range from about 6 mm to about 50 mm, but other lengths may be used. The axial length may vary considerably given other characteristics of the cement matrix 102 and/or the fiber 104, such as the other dimensions of the fiber 104.

In the example of FIG. 1, the fiber 104 has a circular cross section. The fiber diameter may fall in a range from about 0.1 mm to about 1.0 mm, but other diameters may be used. In one example, the fiber diameter is about 0.20 mm, but other fiber diameters may be used. Other fiber shapes may be used. For instance, the fiber 104 may be plate-shaped. Other rectilinear and non-rounded shapes may also be used.

In some cases, the fiber 104 is composed of, or otherwise includes, steel. The composition of the fiber 104 may otherwise vary. For example, the fiber 104 may include one or more additional materials incorporated into the steel to increase strength, improve corrosion resistance, and/or achieve other material properties. In some cases, the fiber 104 may be coated with brass to aid in manufacturing and provide corrosion resistance.

Each fiber 104 may be rod-shaped. Each fiber 104 may accordingly be configured as, or otherwise include, a rod. In some cases, the fiber 104 is or includes a steel rod. The configuration and other characteristics of the rod may vary. For instance, the rod may be considered or configured as a wire in some cases. Other types of rods or other fibers may be used. The term "rod" is accordingly used in a broad sense to include a wide variety of diameters, shapes, and sizes. For instance, the rod may be or include any type of elongated bar regardless of cross-sectional shape.

As described herein, a surface of the steel rod or other fiber 104 has a series of striations 106 formed therein. Each striation 106 may be or include an indentation or other notch or recess in the surface of the fiber 104. The cement matrix 102 seeps into, or is otherwise disposed in, each striation 106.

Each striation 106 may be formed by impression, material removal and/or other striation techniques. Examples of press-based striation techniques are described below in connection with the manufacturing systems and methods of FIGS. 4 and 5. Chemical, laser, or other etching or ablation methods may alternatively or additionally be used to striate the fiber 104. The manner in which each striation 106 is formed may thus vary. The fiber 104 may have any number of striations 106.

The striations 106 are schematically depicted in FIG. 1 for ease in illustration. The shape of each striation 106 may thus vary from the example shown. For example, in some cases, each striation 106 may have a ridge or other raised portion along outer edges thereof. The ridges may be formed during a striation procedure. For instance, the ridges may be formed as material is pushed out of the region occupied by the striation 106.

The series of striations 106 are arranged in a striation pattern. In the example of FIG. 1, the striation pattern includes a single set of striations oriented in parallel with one another. The striation pattern repeats along a longitudinal axis 108 of the fiber 104. The period of the repetition establishes an axial spacing or distance between adjacent striations 106. The axial spacing may be selected to achieve a desired striation characteristic and/or bonding effect with the cement matrix 102. For instance, closer striations are more likely to form ridges, which may be useful for energy dissipation. Further apart striations are more likely to form shear keys in the cement matrix 102, as described below. In one example, the axial spacing may fall in a range from about 0.2 mm to about 3.0 mm, but other axial spacing distances may be used. The axial spacing may vary considerably from the example shown.

In the example of FIG. 1, the striation pattern is such that each striation 106 is or includes an indentation oriented transversely to the longitudinal axis 108. Alternative or additional striation orientations may be used. The striation pattern may include multiple subsidiary patterns. For example, one subsidiary pattern may involve transverse striations as shown, while another subsidiary pattern may involve axial notches that overlap with the transverse striations, forming a cross-shaped striation. A variety of other overlapping and non-overlapping patterns may be used.

Each striation 106 may be or include an elongated recession in the surface of the fiber 104. In the example of FIG. 1, each striation 106 is an elongated indentation in the transverse direction. Each striation 106 may be terminated at two ends 110. Each end 110 may be an edge along the surface of the fiber 104 established by the depth of the striation 106. In this case, the length of each striation 106, i.e., the distance between the two ends 110, is longer than the axial width. The length and width may be selected to optimize or otherwise configure the bond with the cement matrix 102. The transverse or other length of the striations 106 may vary with the orientation of the striation. So a wide variety of lengths may be used. The axial width of each indentation may vary with the fiber diameter. The axial width may increase with increasing fiber diameter. Thus, in some cases, thin fibers may have thinner striations, and thicker fibers may have larger striations. A wide range of widths may thus be used. The point at, or manner in, which each striation 106 terminates may vary from the example shown. For instance, the striations 106 may be continuous (e.g., helical or axial) or otherwise continue around the circumference or perimeter of the fiber 104.

The depth D of each striation 106 may also be selected to optimize or otherwise configure the bond with the cement matrix 102. For instance, the depth D may be selected relative to the remaining thickness T of the fiber 104. In some cases, the striation depth and width may affect the strength of a shear key (described below) formed by the cementitious material and influence the pullout strength of the fiber.

With the rounded fiber 104 of FIG. 1, each striation 106 is disposed within a segment 112 of the circular cross-section. Each striation 106 has a lower boundary positioned at a depth corresponding with a chord of the segment 112. The segment 112 and, thus, the striation depth may be determined by one or more characteristics of the manufacturing process, examples of which are described below. The depth of the striations 106 may fall in a range from about 0.05 mm to about 0.3 mm, but other depths may be used. For instance, the depth may vary in accordance with the fiber diameter. In other cases, the striations 106 are not limited to a segment of the circular cross-section. For instance, helical or circumferential striations 106 may be formed.

The striations 106 are formed and configured such that the longitudinal axis 108 of the fiber 104 is not modified. For instance, the manner in which the striations 106 is formed does not bend the fiber 104. Straight fibers may thus be embedded in the concrete matrix 102. Maintaining a straight axis preserves the axial stiffness of the fiber 104 and allows shorter fibers to be used. While the longitudinal axis 108 is a straight axis for an entire length of the fiber 104, the striations 104 may be formed in non-straight fibers in other cases. For example, the fiber 104 may be crimped, bent into a zigzag shape, have curved ends, or present or include other axial deviations.

The cement matrix 102 is configured such that portions of the cement matrix 102 are disposed in the striations 106. For instance, once the fiber 104 is embedded in the cement matrix 102, cementitious paste seeps into each of the striations 106. Each such portion of the cement matrix 102 may form a shear key with the respective striation 106. The shear key is thus formed by the cementitious material, and is anchored by the striation 106 during pullout. Thus, each shear key includes a respective portion of the concrete matrix 102 disposed in a respective striation 106. Under high loading that attempts to pull the fiber 104 out of the cement matrix 102, the cement matrix 102, as well as the striation 106, are being sheared. When the shear key fails in shear, the resistance of the shear key disappears, thereby reducing the residual pullout strength of the fiber. In some cases, ridges of the striation are also subjected to shear force. As a result, the shear keys improve the bond capacity of the cement matrix 102 and, thus, increase the force levels during fiber pullout.

In the example of FIG. 1, the striations 106 are formed on a single side or face of the fiber 104. In other cases, the surface of the fiber 104 has a one or more additional series of striations. For example, striations 114 may be disposed along an opposite side or face of the fiber 104. Each striation 114 of the further series of striations may thus be disposed within a different segment 116 of the circular cross section.

The striations 106 may be formed in addition to other features or characteristics of the fiber 104 that may be directed to improving the bond with the cement matrix 102. In some cases, the surface of the steel rod has abrasions 118 to that end. As shown in the example of FIG. 1, the abrasions 118 are disposed outside of the series of striations 106. As a result, the steel rod may not be smooth outside of the series of striations 106. The abrasions 118 may be present as an artifact of the process of fabricating the steel rod, and/or be subsequently added via, for instance, a roughening procedure. The striations 106 are compatible with these and other techniques for enhancing the performance of the fiber reinforcement of the cement matrix 102.

Figure 2:
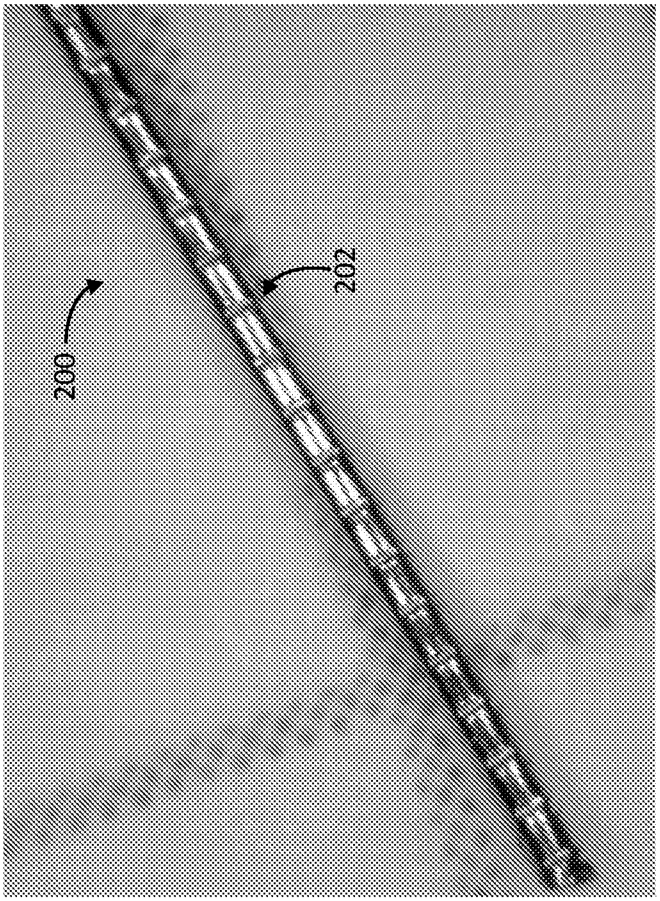
FIG. 2 is a perspective view of a cement reinforcement fiber having a series of transverse striations in accordance with one example.

FIG. 2 depicts a fiber 200 having a series of striations 202 arranged in a parallel pattern in accordance with one example. In this case, each striation 202 is elongated in a direction transverse to the longitudinal axis of the fiber 200. The striations 202 are spaced apart from one another in a periodic manner. The striations 202 may be formed via an impression procedure, such as the method described below.

The example of FIG. 2 has the following approximate fiber, striation, and striation pattern dimensions:

| | |
|---|---|
| fiber diameter | 0.3 mm |
| fiber length | 19 mm |
| axial spacing | 0.35 mm |
| striation depth | 0.075 mm |
| striation length | 0.2 mm |
| striation width | 0.085 mm. |

The dimensions may vary from the example shown.

Figure 3:
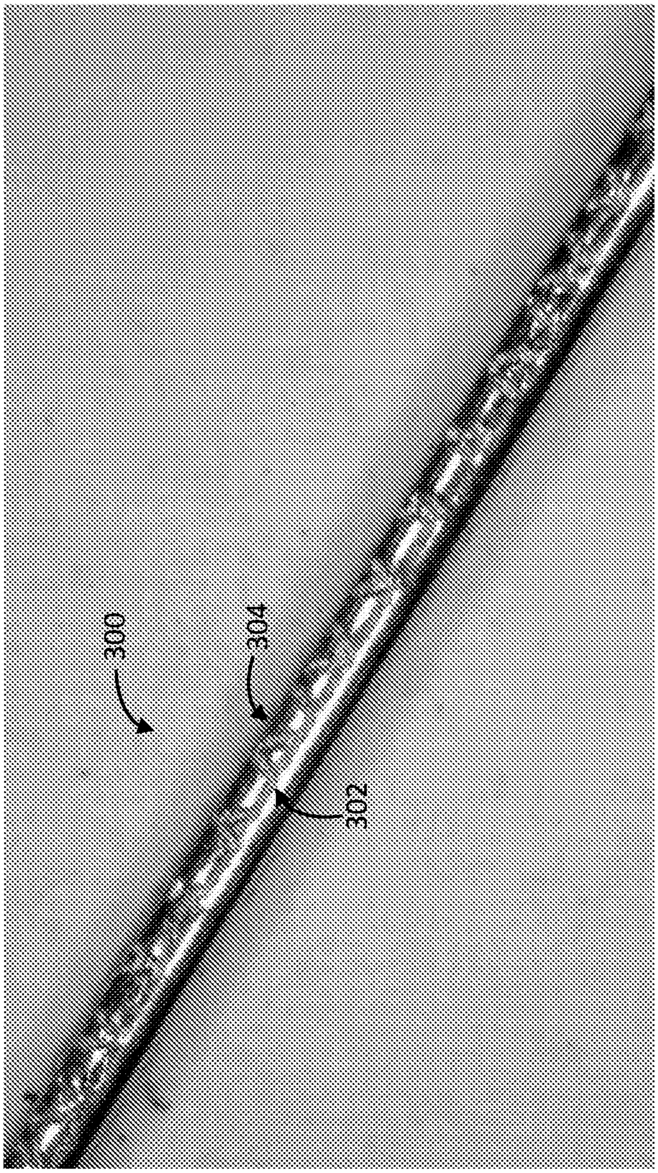
FIG. 3 is a perspective view of a cement reinforcement fiber having a striation pattern with both transverse and diagonal striations in accordance with one example.

FIG. 3 depicts a fiber 300 having a series of striations 302, 304 arranged in accordance with another example striation pattern. The striation pattern is repeated along the longitudinal axis of the fiber, as in the examples described above. In this case, the striation pattern may be considered to include multiple subsets of parallel striations. Within each subset, the striations are again spaced apart from one another in a periodic manner. The first subset of striations includes the striations 302, which are elongated in a direction transverse to the longitudinal axis of the fiber 300. The second subset of striations includes the striations 304, which are elongated in a direction oriented on a diagonal relative to the longitudinal axis of the fiber 300.

The striation pattern of the fiber 300 may alternatively be considered to include a single set of striations. In this view, each striation includes multiple indentations or other recesses or notches. Whether considered to have a single set or multiple sets, the striations 302, 304 may be formed via an impression procedure, such as the method described below.

The fiber 300 and the striations 302, 304 may be dimensioned and otherwise configured similarly to the example described above in connection with FIG. 2. The axial spacing may be considered to differ as a result of the inclusion of the diagonal subset of striations. However, the axial spacing may remain similar if measured between striations of similar orientation (e.g., the distance between adjacent transverse striations).

Figure 4:
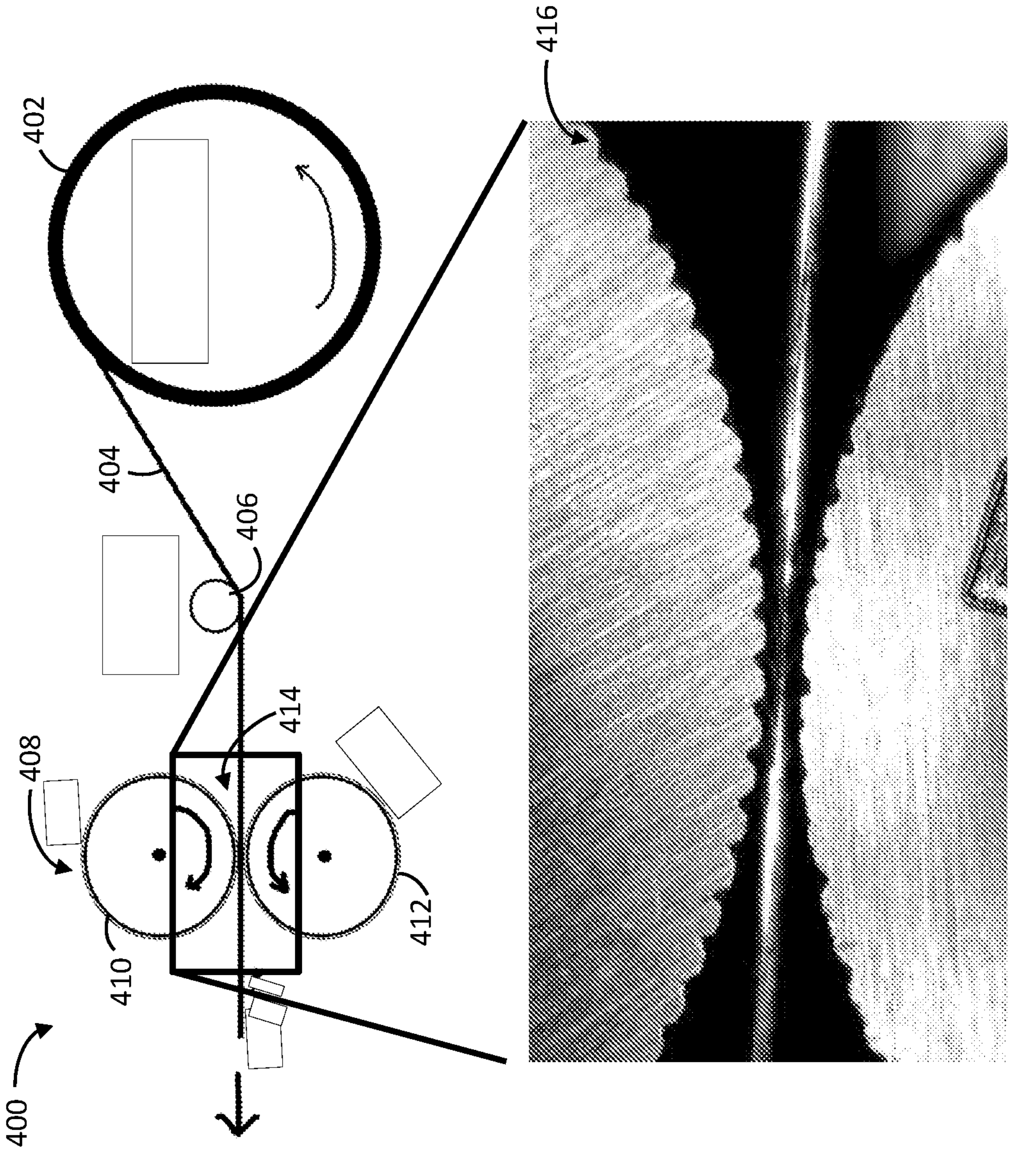
FIG. 4 is a schematic view of a system for manufacturing cement reinforcement fibers having one or more series of striations arranged in one or more striation patterns in accordance with one example.

FIG. 4 depicts a system 400 for form a series of striations on a fiber. In this example, the system 400 is configured as a press to striate the fiber by indenting or via impressions. The system 400 may be incorporated into the process of cutting the fibers to a desired length as a steel wire coil 402 is unwound to provide a continuous feed of fiber 404. The system 400 may include a pulley 406 and/or other guides or mechanisms to direct the fiber 404 to a press 408, through which the fiber 404 is fed.

The press 408 includes a number of press pieces 410, 412 to striate the fiber 404. In this example, the press 408 includes a pair of press pieces 410, 412 separated from one another by a gap 414. The fiber 404 is fed through the gap 414. The gap 414 is smaller than the diameter of the fiber 404 such that the fiber 404 is striated as the fiber 404 passes through the gap 414. To that end, one or both of the press pieces 410, 412 includes a set of teeth or knurls 416 disposed about the exterior thereof. The teeth 416 are pressed into the fiber 404 to striate the fiber 414. The teeth 416 are arranged in a pattern that matches the striation pattern desired for the fiber 404. The teeth 416 may be, for example, composed of, or may otherwise include, hardened steel.

One or more of the press pieces 410, 412 is rounded. In the example of FIG. 4, both of the press pieces 410, 412 are rounded. For example, each press piece 410, 412 may be or include a wheel, disc, or cylinder that rotates about a respective axis as the fiber 404 passes through the gap 414. In some cases, one of press pieces 410 has a knurled exterior, while the other press piece 412 includes a flat (e.g., cylindrical) exterior. In other cases, one of the press pieces 410, 412 may be a flat and/or stationary. Other types of presses may be used. For instance, a non-rotational press, such as a stamp or a clamp, may be used to indent or otherwise striate the fiber 404.

Additional, fewer, or alternative press pieces may be included. For example, the press 408 may include an additional pair of press pieces disposed in a different orientation than the press pieces 410, 412. An additional series of striations may thus be formed along a different side or face of the fiber 404. Alternatively or additionally, the fiber 404 may be rotated before the fiber 404 is fed into the additional pair of press pieces. In still other cases, the fiber 404 may be fed between the press pieces 410, 412 multiple times. With each repeat pass, the fiber may be rotated to striate different sides. Multiple passes of the fiber 404 through the press 408 may also be used to create further striations along a respective side or face of the fiber 404 in the event that the fiber 404 is not rotated.

Figure 5:
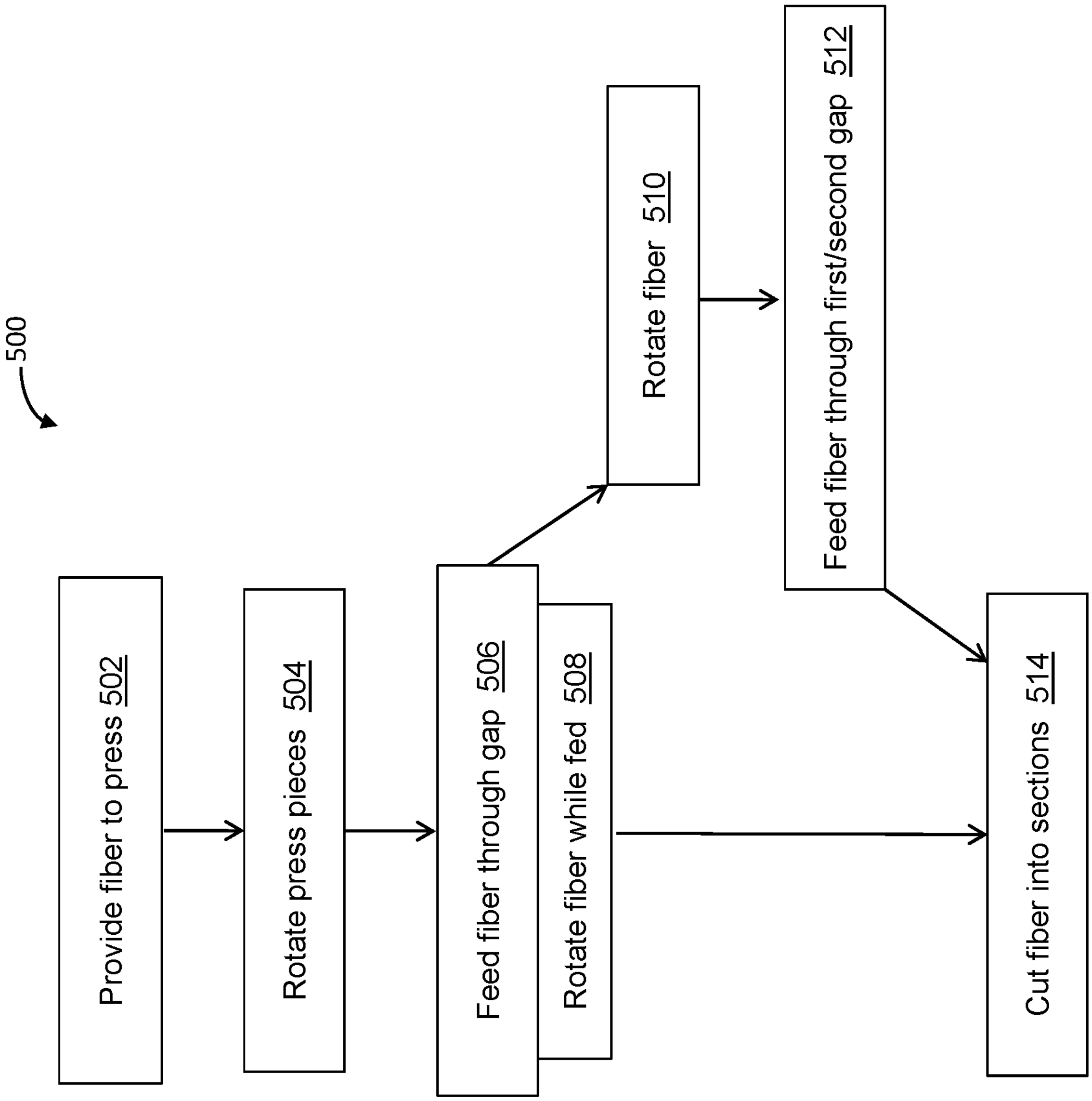
FIG. 5 is a flow diagram of a method of manufacturing a concrete reinforcement fiber to be embedded in concrete in accordance with one example.

FIG. 5 depicts a method 500 of manufacturing a fiber to be embedded in concrete for reinforcement of the concrete. The method 500 may be implemented using the press system 400 of FIG. 4, and/or another system. For instance, the method 500 may use a press system having one or more rounded press pieces with a set of teeth configured to striate the fiber to form a series of striations in the fiber having a striation pattern in accordance with the set of teeth. In some cases, the method 500 may be integrated with a manufacturing process utilized to cut the fiber into sections from a continuous feed, such as a fiber coil.

The method 500 may begin in an act 502 in which the fiber is provided to a press or press system having one or more presses. The press may include a pair of press pieces, as described above. At least one of the press pieces is rounded. The press pieces are spaced apart from one another by a gap through which the fiber is passed. The gap is sized relative to the diameter of the fiber such that a straight longitudinal axis of the fiber is maintained despite feeding the fiber through the gap. The act 502 may include any number of pulley or other stages directed to straightening or unwinding the fiber, conveying the fiber, or otherwise feeding the fiber to the press.

In act 504, the rounded press piece(s) is/are rotated. One or more of the press pieces has exterior teeth or knurls to striate the fiber. The teeth are arranged in a pattern to create the desired striation pattern on the fiber. The press pieces may be configured to form any desired striation pattern, such as the transverse and/or diagonal striation patterns described above, and/or another pattern. In some cases, the rotation may be used to draw the fiber feed through the press.

The fiber is fed through the gap between the pair of rounded press pieces in an act 506. The gap is smaller than a diameter of the fiber, such that the teeth indent or striate the fiber. In some cases, the act 506 includes an act 508 in which the fiber is rotated while fed through the press. The rotation may be used to create a striation pattern not limited to a single face or side of the fiber. For example, a helical striation pattern may be created in cases in which the fiber is continuously rotated while fed through the press. The rotation may be discontinuous or otherwise configured to create other desired striation patterns.

In some cases, the method 500 includes an act 510 in which the fiber is rotated after passing through the pair of press pieces. The rotation of the act 510 may be used to reorient the fiber before further striation in an act 512, in which the fiber is fed either through the gap of the aforementioned pair of press pieces (i.e., a second pass) or through another pair of press pieces (i.e., a second gap). In either case, the act 512 may be used to form a second series of striations in the fiber. Any number of passes or presses may be used in other cases to achieve a desired striation pattern.

After the fiber is fed through the final gap of the striation processing is finished, the fiber is cut into fiber sections in an act 514. The fiber may be cut using any known or heretofore developed method.

The method 500 may include additional, fewer, or alternative acts. For instance, the method 500 may include any number of additional passes through the press pieces with or without intervening or contemporaneous rotation. Alternatively or additionally, the method 500 may include one or more acts directed to roughening or otherwise processing the surface of the fiber.

The order in which the acts of the method 500 are implemented may vary from the example shown. For example, the fiber may be cut in some cases before all of the surface processing is complete.

Figure 6:
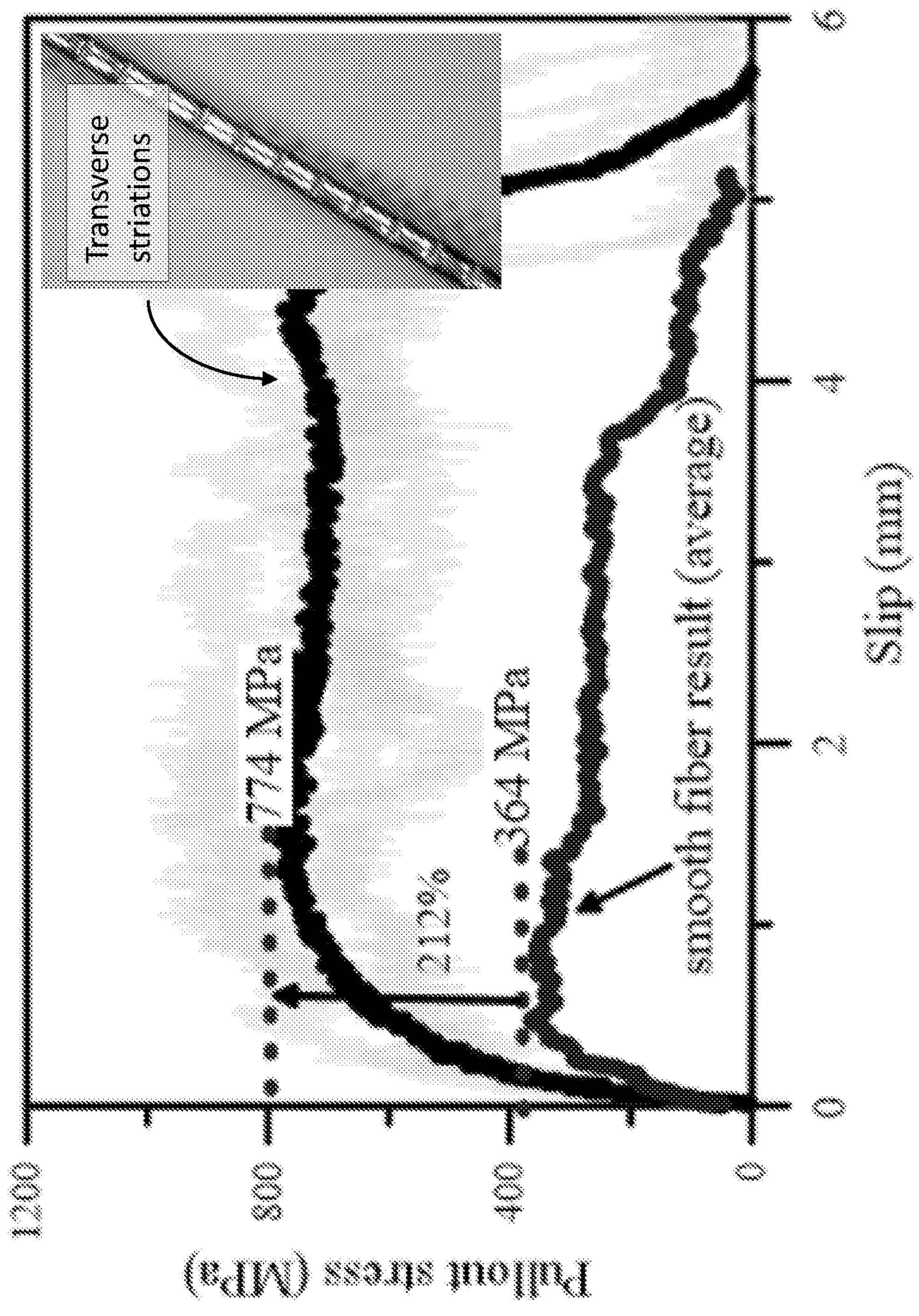
FIG. 6 is a plot of pullout stress levels exhibited at various amounts of slip by concrete structures having either transversely striated fibers or smooth fibers.

FIG. 6 shows the results of a fiber pullout test involving a traditional steel fiber and an example of one of the disclosed fibers having transverse striations. Fiber pullout is a fundamental test used to characterize the level of interaction between a fiber and the surrounding concrete matrix in which the fiber is embedded. The force (or fiber stress) versus deformation response is measured during the pullout test and the peak force and dissipated energy (area under the curve) are computed. The pullout stress is thus a measure of bond capacity to the concrete. In this example, the superior performance of the disclosed fiber is evidenced by a 212% increase in pullout stress relative to a smooth fiber. The data indicates that the disclosed fiber has more than double the bond capacity and three times the energy dissipation capacity. In another test, the disclosed fibers provide about four times the pullout stress, and about twice the energy dissipation capacity. The characteristics of the striations may be modified to achieve a desired level of pullout stress and energy dissipation capacity.

Figure 7:
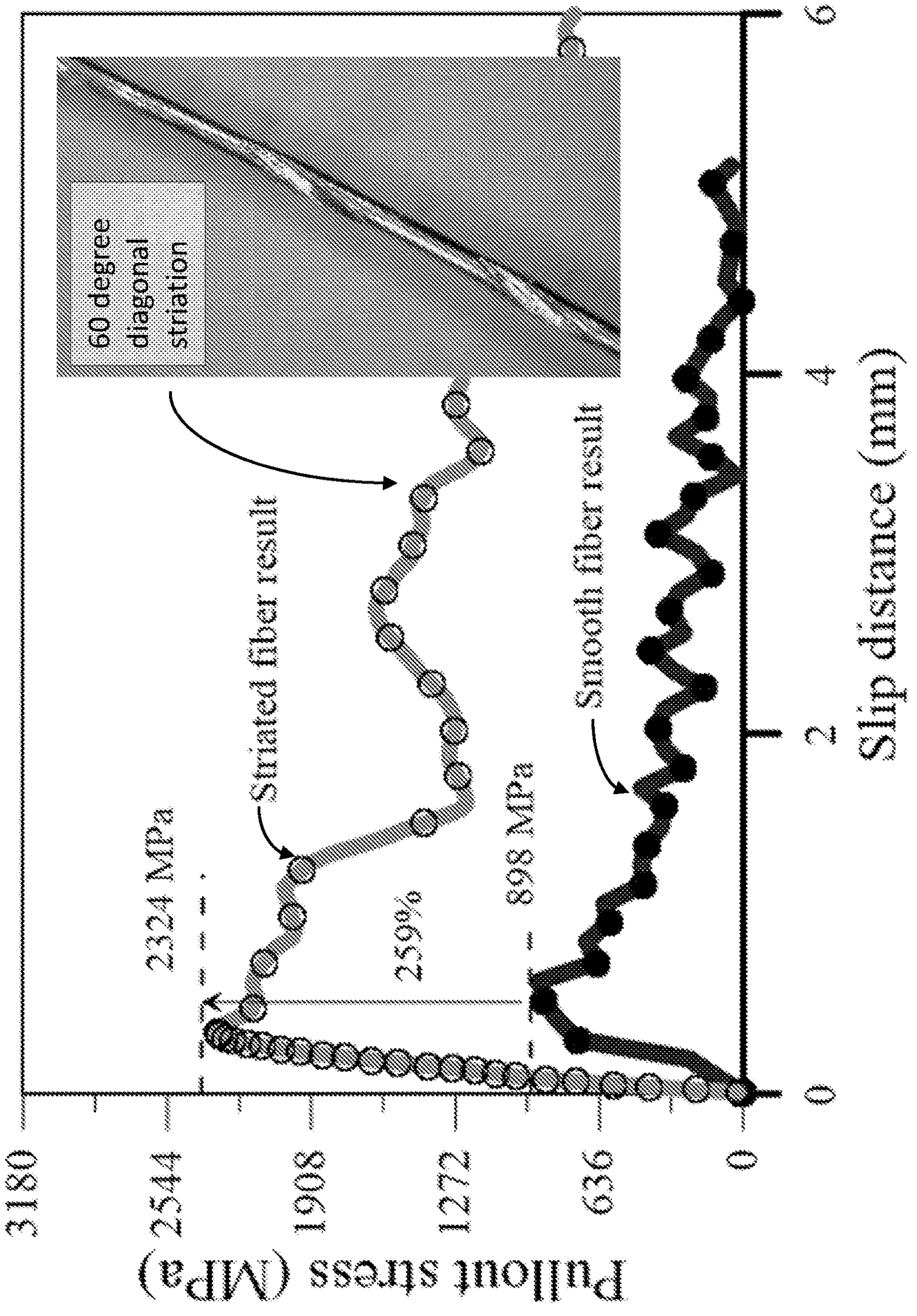
FIG. 7 is a plot of pullout stress levels exhibited at various amounts of slip by concrete structures having either diagonally striated fibers or smooth fibers.

FIG. 7 depicts a plot of further pullout stress data for another example of the disclosed fibers. In this case, the fiber has a diagonal striation pattern. The diagonal striations are oriented at a 60-degree angle as shown in the inset of the plot. This striation pattern leads to a 259% increase in pullout stress relative to a smooth fiber. The fiber also exhibits 4.8 times the energy dissipation capacity of a smooth fiber.

Figure 8:
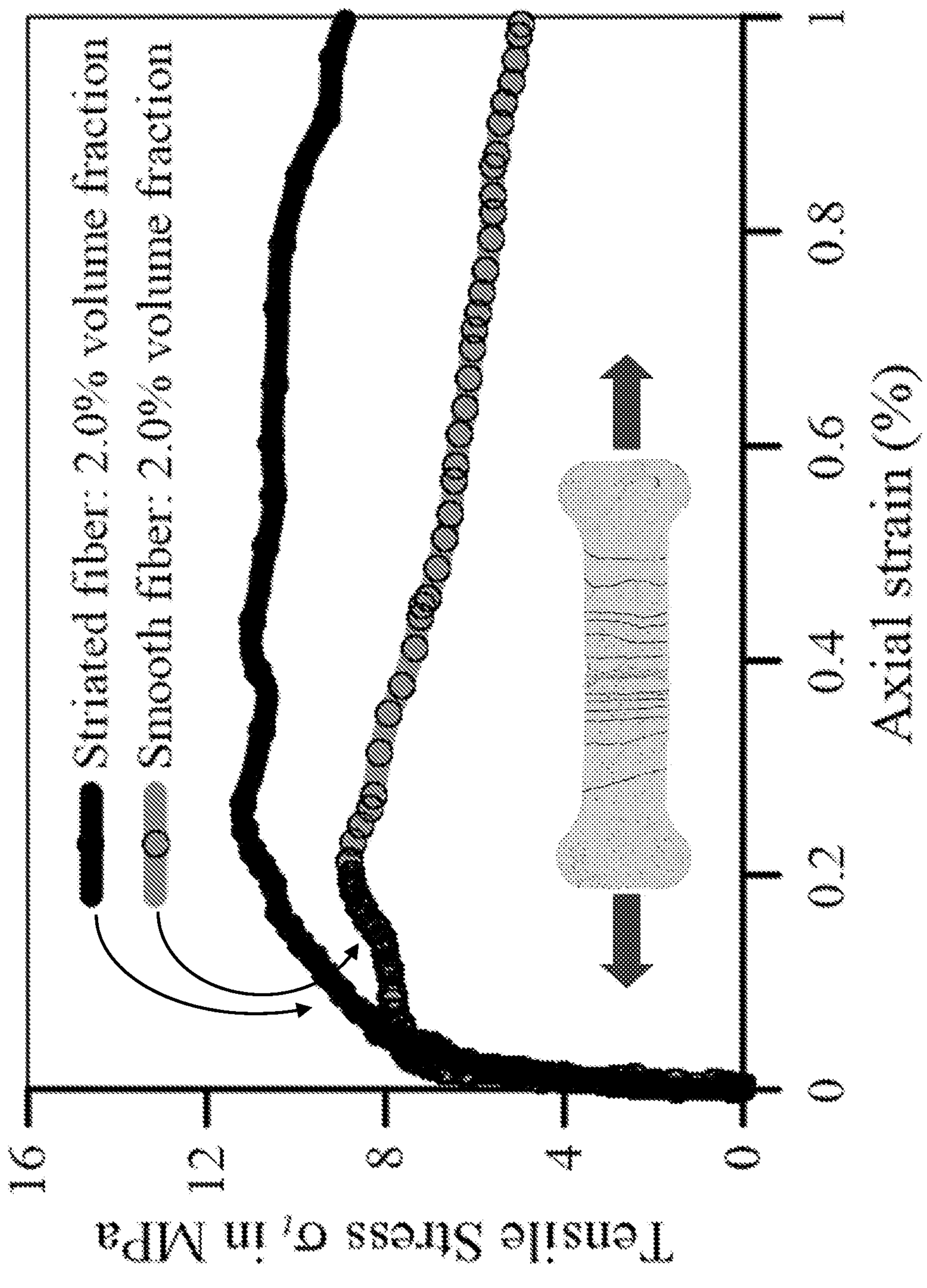
FIG. 8 is a plot of stress-strain responses for concrete structures having either striated fibers or smooth fibers.

FIG. 8 is a plot that compares the stress-strain response of composite structures with non-striated and striated fibers. In each case, the fibers amount to 2.0% of the volume of the composite structure. The composite structure with striated fibers exhibits significantly higher tensile strength levels over a wide range of axial strain amounts. FIG. 8 also shows how the composite with striated fibers is more ductile than another with non-striated fibers. Ductility is the ability to deform without losing strength. The increased ductility is exhibited by comparing the difference in strains (on the horizontal axis of the plot) at peak stress (via the vertical axis of the plot) for both composites.

Described above are striated fibers and methods of striating the fibers. The disclosed fibers are significantly more effective at reinforcing ultrahigh performance and other concrete. The disclosed fibers have been shown to have significantly increased bond capacity and energy dissipation capacity relative to traditional steel fibers. The disclosed fibers are therefore capable of significantly reducing the cost of ultrahigh performance concrete because the performance improvements present an option to use the fibers in lower dosages than previously possible with other fibers, while still achieving the same level of reinforcement. The striation of the fibers may be conveniently incorporated into the manufacturing process, thereby adding little to the fiber manufacturing cost. The disclosed fibers are capable of tailoring the performance of the concrete (e.g., ultrahigh performance concrete). For instance, the material can be optimized for strength (for structural applications) or energy dissipation (for blast-resistance). The disclosed fibers thus offer the ability to tailor material response.

The present disclosure has been described with reference to specific examples that are intended to be illustrative only and not to be limiting of the disclosure. Changes, additions and/or deletions may be made to the examples without departing from the spirit and scope of the disclosure.

The foregoing description is given for clearness of understanding only, and no unnecessary limitations should be understood therefrom.

What is claimed is:

1. A composite structure comprising:

a concrete matrix comprising ultrahigh performance concrete; and a fiber embedded in the concrete matrix, the fiber comprising steel;

wherein a surface of the fiber has a series of striations, the series of striations being arranged in a striation pattern;

wherein each striation of the series of striations has a depth less than a length of the striation, the series of striations being configured to increase ductility of the concrete matrix; and wherein the fiber has a length of 19 mm or less, has a diameter falling in a range from 0.1 mm to 0.2 mm, and is not mechanically deformed.

2. The composite structure of claim 1, wherein the concrete matrix comprises a plurality of shear keys, each shear key of the plurality of shear keys comprising a respective portion of the concrete matrix disposed in a respective striation of the series of striations.

3. The composite structure of claim 1, wherein:

the fiber has a longitudinal axis; and the series of striations do not modify the longitudinal axis of the fiber.

4. The composite structure of claim 3, wherein the longitudinal axis is a straight axis for an entire length of the fiber.

5. The composite structure of claim 3, wherein at least a subset of the series of striations is elongated in a direction transverse to the longitudinal axis.

6. The composite structure of claim 3, wherein at least a subset of the series of striations is elongated in a direction oriented on a diagonal relative to the longitudinal axis.

7. The composite structure of claim 3, wherein the striation pattern repeats along the longitudinal axis.

8. The composite structure of claim 1, wherein each striation of the series of striations is elongated and terminated at two ends.

9. The composite structure of claim 1, wherein the striations of the series of striations are oriented in parallel with one another.

10. The composite structure of claim 1, wherein the series of striations comprises multiple subsets of parallel striations.

11. The composite structure of claim 1, wherein:

the fiber has a circular cross section; and each striation of the series of striations is disposed within a segment of the circular cross-section.

12. The composite structure of claim 11, wherein:

the surface of the fiber has a further series of striations;

each striation of the further series of striations is disposed within a further segment of the circular cross section.

13. The composite structure of claim 1, wherein the fiber has a rectilinear cross section.

14. The composite structure of claim 1, wherein the fiber comprises a steel rod.

15. The composite structure of claim 14, wherein:

the steel rod has a circular cross section; and each striation of the series of striations is disposed within a segment of the circular cross section.

* * * * *